(12) United States Patent
Huang

(10) Patent No.: US 9,514,335 B2
(45) Date of Patent: *Dec. 6, 2016

(54) ANTI-TAMPER DEVICE

(71) Applicant: HON HAI PRECISION INDUSTRY CO., LTD., New Taipei (TW)

(72) Inventor: Ying-Jui Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,088

(22) Filed: Oct. 28, 2014

(65) Prior Publication Data

US 2016/0055355 A1 Feb. 25, 2016

(30) Foreign Application Priority Data

Aug. 22, 2014 (TW) .............................. 103129027 A

(51) Int. Cl.
*H05K 5/00* (2006.01)
*G06F 21/87* (2013.01)

(52) U.S. Cl.
CPC ..................................... *G06F 21/87* (2013.01)

(58) Field of Classification Search
USPC .......................... 361/752, 748, 736; 257/678
See application file for complete search history.

(56) References Cited

U.S. PATENT DOCUMENTS

| 8,279,075 B2 * | 10/2012 | Fleischman | ............. G06F 21/86 340/652 |
| 8,687,371 B2 * | 4/2014 | Arshad | ................... G06F 21/86 235/382 |
| 2010/0039219 A1 | 2/2010 | Peng | |

* cited by examiner

*Primary Examiner* — Andargie M Aychillhum
(74) *Attorney, Agent, or Firm* — Zhigang Ma

(57) ABSTRACT

An anti-tamper device for preventing data from being tampered with by an unauthorized person includes a top cover, a bottom cover, a printed circuit board (PCB), and a signal connector. The bottom cover is assembled to the top cover. The PCB is provided with a plurality of pads. The signal connector is fixed to the top cover, and the signal connector defines a plurality of terminal grooves. At least one of the terminal grooves receives a terminal. When the terminal is electrically connected with the pads for the first time, a first relation signal is generated for initializing the anti-tamper device. When the terminal is electrically disconnected from the pads and the terminal is electrically connected with the pads for the second relation signal. If the second relation signal is different from the first relation signal, the anti-tamper device is prevented from being initialized.

19 Claims, 7 Drawing Sheets

ANTI-TAMPER DEVICE

FIELD

The subject matter relates to data protection technologies, and particularly to an anti-tamper device.

BACKGROUND

Electronic devices usually store confidential data such as account information in components of the electronic devices. In order to prevent an unauthorized person from accessing the components storing the confidential data, the components are located in a sealed housing. However, the housing of the electronic device must be opened in order for a service technician to repair or replace any components when maintenance of the electronic components is required. As a result, the housing can be opened by anyone to access the electronic components storing the confidential data and tamper with the confidential data.

BRIEF DESCRIPTION OF THE DRAWINGS

Implementations of the present technology will now be described, by way of example only, with reference to the attached figures.

DETAILED DESCRIPTION

Figure 1:
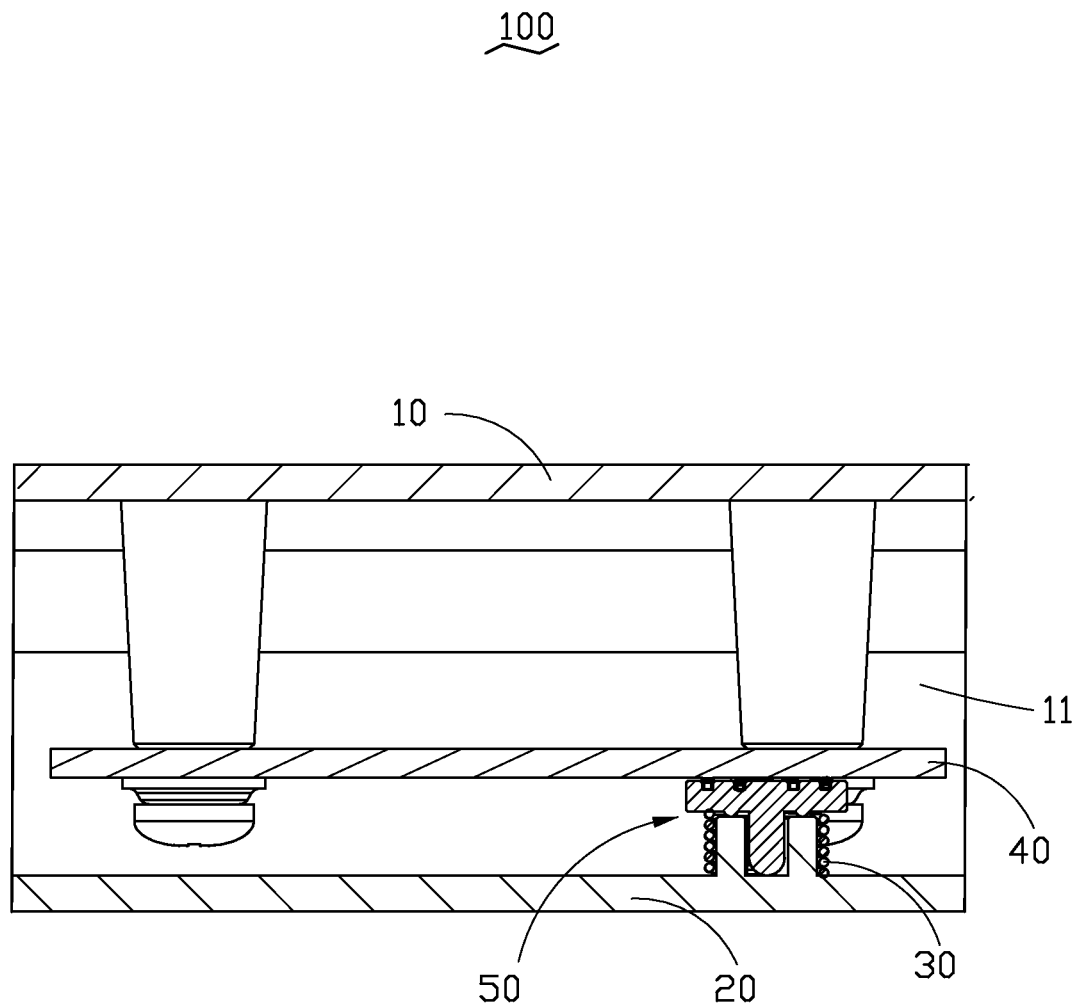
FIG. 1 is a cross-sectional view of an anti-tamper device including a printed circuit board (PCB) and a signal connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to anti-tamper device 100.

FIG. 1 illustrates an anti-tamper device 100 for securing data. The anti-tamper device 100 can be a set-top box, router, a computer, or a portable device and include a top cover 10, a bottom cover 20, a printed circuit board 40 (PCB), an elastic element 30, and a signal connector 50. The top cover 10 is detachably coupled to the bottom cover 20, defining a receiving space 11 for receiving the PCB 40 and the signal connector 50. The PCB 40 is fixed to the top cover 10 and located between the top cover 10 and the bottom cover 20 and is detachably located on the bottom cover 20 and located between the PCB 40 and the bottom cover 20. The elastic element 30 is located between the signal connector 50 and the bottom cover 20. In at least one embodiment, the elastic element 30 is a spring. When the top cover 10 is coupled to the bottom cover 20, the PCB 40 is pressed on the signal connector 50 and forces the signal connector 50 to move toward the bottom cover 20, and the elastic element 30 is compressed to generate an elastic force. When the top cover 10 is disengaged from the bottom cover 20, the PCB 40 is separated from the signal connector 50, and the elastic force is released to drive the signal connector 50.

Figure 2:
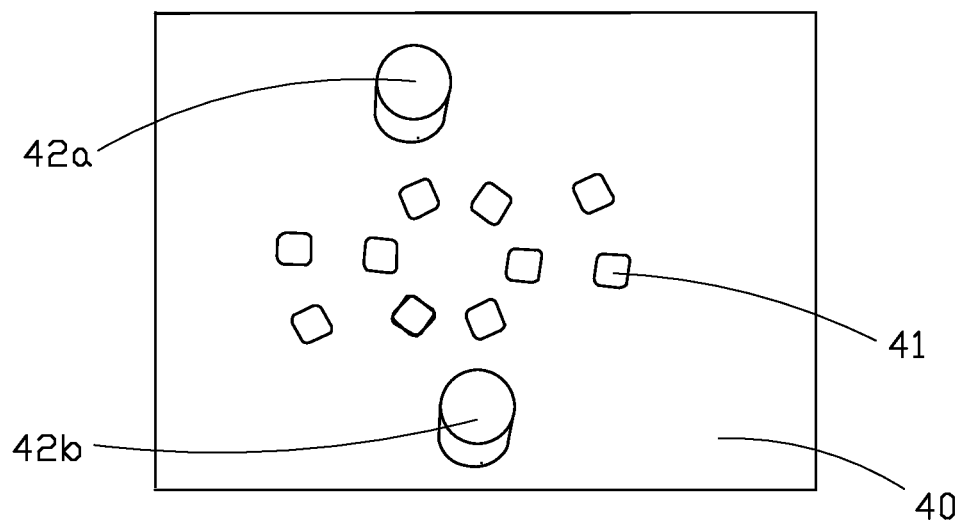
FIG. 2 is a diagrammatic view of the signal connector of FIG. 1.

FIG. 2 illustrates that a plurality of pads 41 are located on the PCB 40, and a pair of first magnets 42a, 42b is located on the PCB 40. In at least one embodiment, the first magnets 42a, 42b are in pole or pillar-like structures. The first magnets 42a, 42b protrude from the PCB 40 towards the signal connector 50, and the first magnets 42a, 42b are spaced from each other. In other embodiments, a number of first magnets 42a is not limited to two, can be one, three or more than three.

Figure 3:
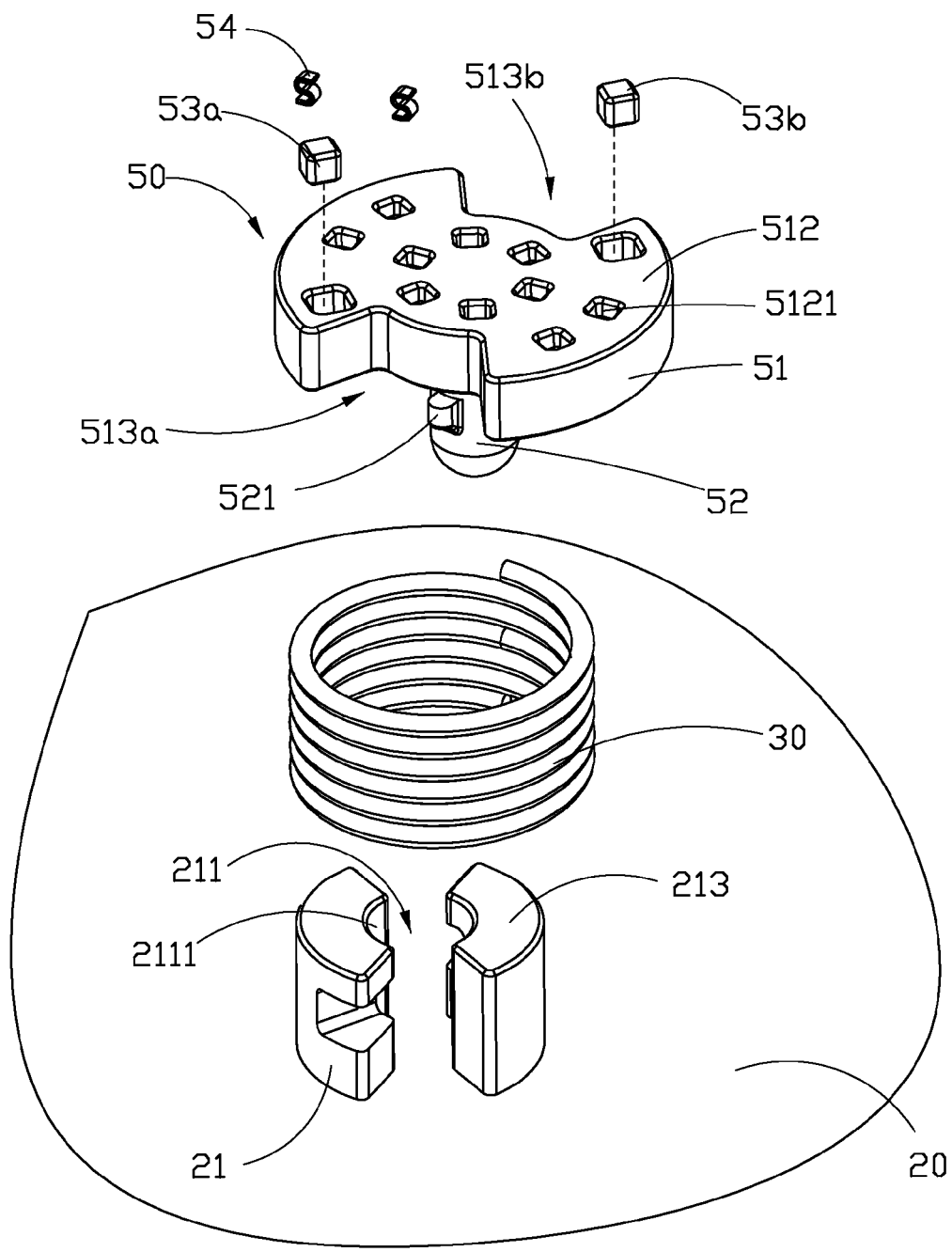
FIG. 3 is an isometric, partial cut-away view of the signal connector of FIG. 1.
Figure 4:
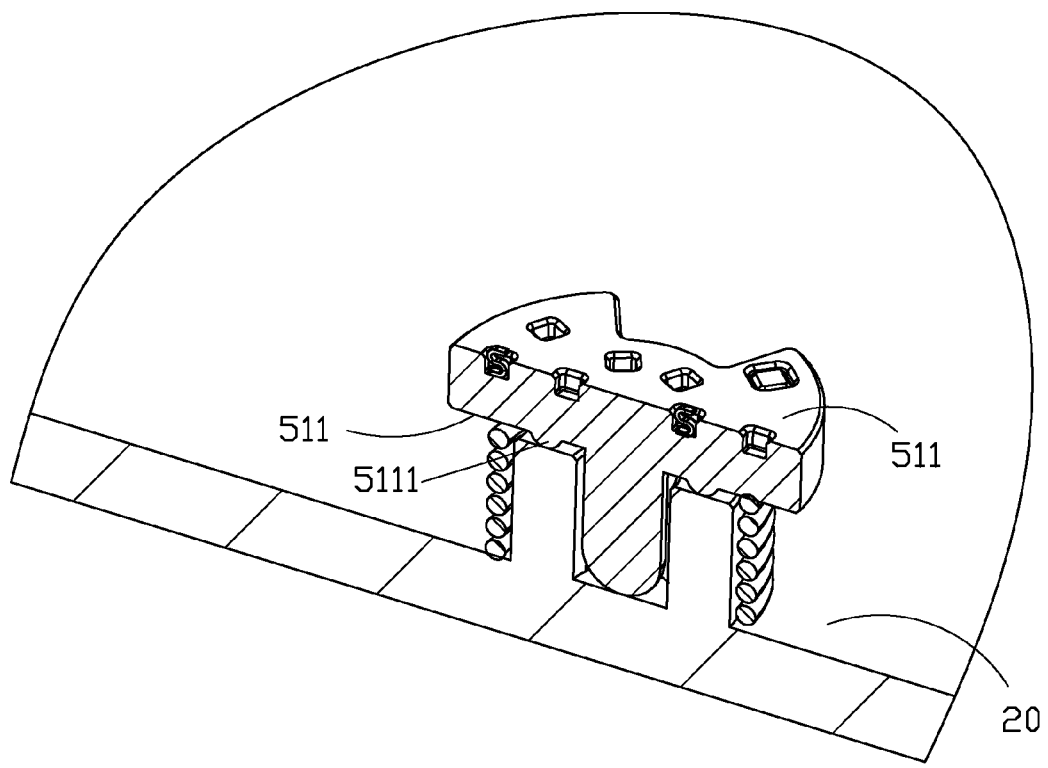
FIG. 4 is an isometric view of the PCB of FIG. 1.

FIGS. 3 and 4 illustrate that the signal connector 50 includes a plurality of terminals 54, a supporting board 51, and a shaft 52. The supporting board 51 includes a first surface 511 and a second surface 512. The first surface 511 faces the bottom cover 20, and the second surface 512 faces the PCB 40. A plurality of terminal grooves 5121 corresponding to the pads 41 are defined in the second surface 512. The terminals 54 are received in the terminal grooves 5121 correspondingly. In at least one embodiment, a number of the terminal grooves 5121 is but not limited to twelve, and a number of the terminals 54 is but not limited to two. A pair of gaps 513a, 513b is defined in an edge of the supporting board 51, symmetrically about the center of the supporting board 51, corresponding to the first magnets 42a, and 42b, respectively. A pair of second magnets 53a, and 53b is received in the terminal grooves 5121 close to the first gap 513a and the second gap 513b, respectively. The second magnets 53a, 53b are symmetrical about the center of the supporting board 51. A pair of protrusions 5111 is located on the first surface 511, symmetrically about the center of the supporting board 51. The shaft 52 is located on the first surface 511, a pair of bulges 521 is located on the shaft 52, and are symmetrical about an axis of the shaft 52. In other embodiments, a number of the bulges can be one, or more than two.

FIG. 2 also illustrates the bottom cover 20 has a bracket 21. In at least one embodiment, the bracket 21 is a pole or a pillar-like structure. The bracket 21 includes a top surface 213 corresponding to the signal connector 50. A connecting hole 211 is defined in the top surface 213 and extends along an axis of the bracket 21. The connecting hole 211 is surrounded by an inner surface 2111 of the bracket 21, and the connecting hole 211 is inserted in the shaft 52. A pair of connecting grooves 212 is defined in the inner surface 2111 for receiving the bulges 521, respectively, and the connecting grooves 212 are symmetrical about the axis of the bracket 21. In other embodiments, a number of the connecting grooves 212 is but not limited to two, the number of the connecting grooves 212 is equal to the number of the bulges 521. Each of the connecting grooves 212 includes a first groove 2121 and a second groove 2122. The first groove 2121 extends along the axis of the bracket 21, an end of the first groove 2121 is located in the top surface 213, the other end of the first groove 2121 communicates with one end of the second groove 2122, and the second groove 2122 extends along a direction perpendicular with the first groove 2121.

Figure 5:
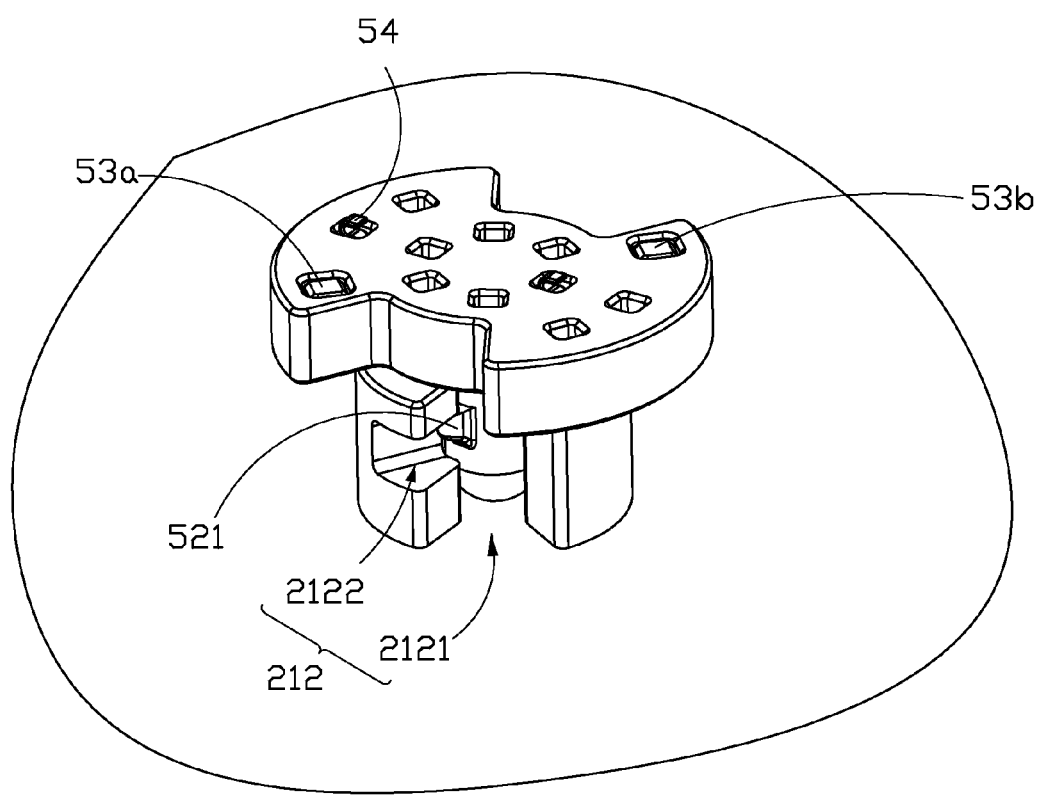
FIG. 5 is an isometric view showing the signal connector in a first state.
Figure 6:
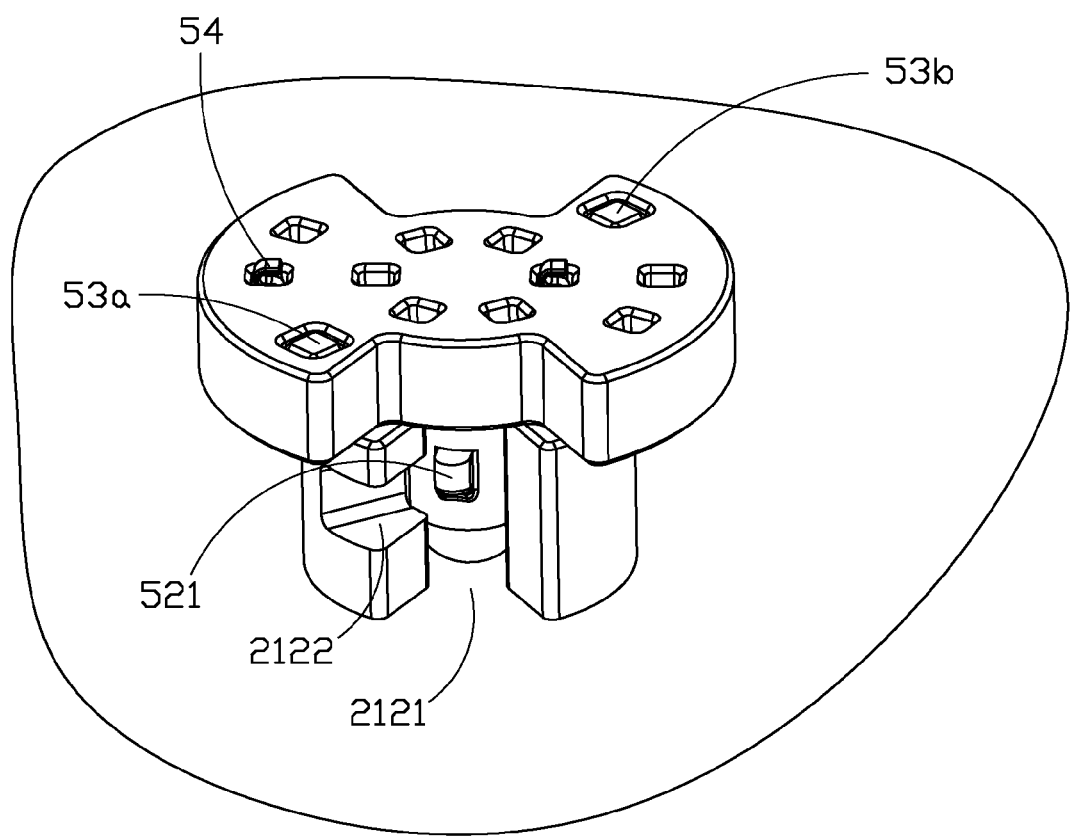
FIG. 6 is an isometric view showing the signal connector in a second state.
Figure 7:
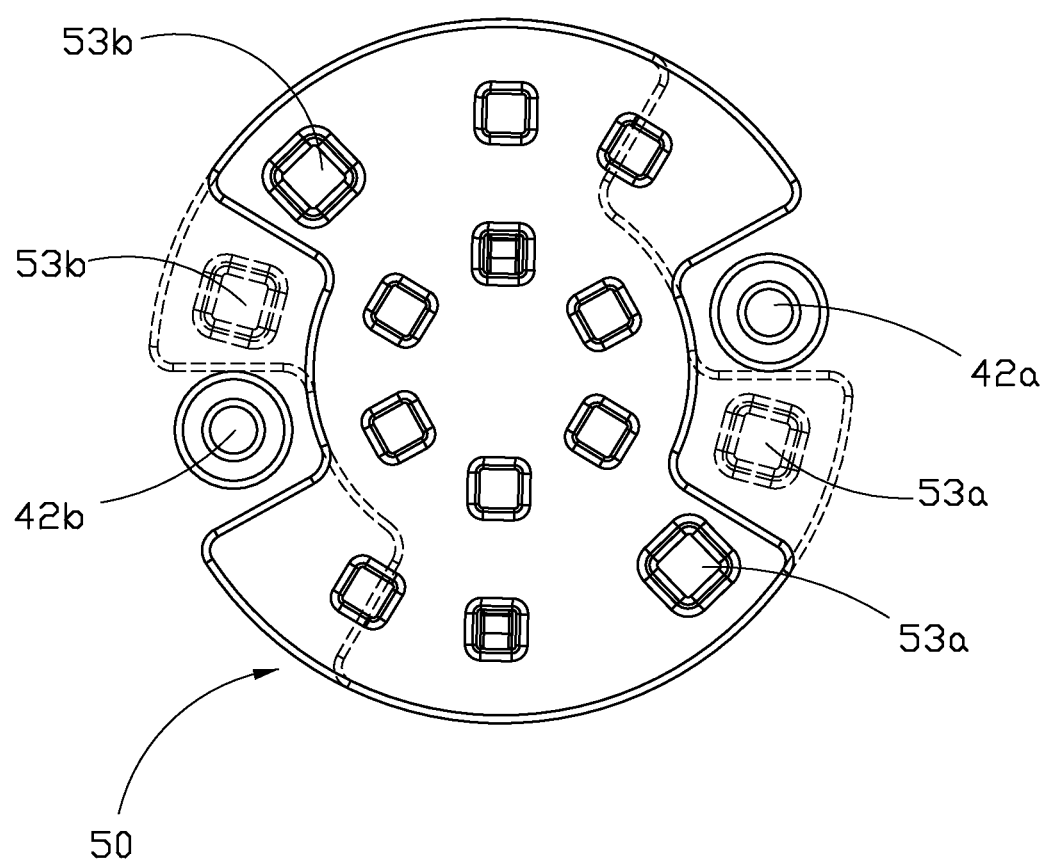
FIG. 7 is a diagrammatic view showing the signal connector of FIG. 1 is rotated from the first state to the second state.

FIGS. 5-7 illustrate when in assembly, first, the bracket 21 passes through the elastic element 30, the shaft 52 is inserted into the connecting hole 211 with the bulges 521 sliding along the first grooves 2121. Second, the shaft 52 is rotated to slide the bulges 521 into the second grooves 2122 locking the signal connector 50 to the bracket 21. In this state, the elastic element 30 is compressed between the first surface 511 and the bottom cover 20, and the protrusions 5111 contact the top surface 213. Third, the top cover 10 is coupled to the bottom cover 20, the PCB 40 is pressed on the second surface 512 of the signal connector 50, and the terminals 54 are electrically connected to the pads 41. In this state, the first magnets 42a, and 42b are inserted among the gaps 513a, and 513b correspondingly; the first magnets 42a, and 42b attract the second magnets 53a, and 53b to drive the shaft 52 to rotate to slide the bulges 521 from the second grooves 2122 to the first grooves 2121 unlocking the signal connector 50 from the bracket 21. Thus, the anti-tamper device 100 has been assembled.

When the anti-tamper device 100 is powered on for the first time after assembly, a first relation signal is generated by the PCB 40 to enable the anti-tamper device 100. The first relation signal indicates which terminal pads are electrically connected to the terminals 54, an original location relationship of the terminals 54 and the terminal grooves 5121. A memory device (not shown) on the PCB 40 is utilized to store the first relation signal.

When the top cover 10 is disengaged from the bottom cover 20 by an unauthorized person, the PCB 40 is separated from the signal connector 50, the terminals 54 are disconnected from the pads 41, the signal connector 50 is released from the bracket 21, which makes the terminals 54 drop from the terminal grooves 5121. Because the terminals 54 have drop from the terminal grooves 5121, the unauthorized person cannot correctly replace the terminals 54 in the corresponding terminal grooves 5121. As a result, when the anti-tamper device 100 is assembled again as described above, a current location relationship between the terminals 54 and the terminal grooves 5121 will be different from the original location relationship described above. Furthermore, when the anti-tamper device 100 is powered on after being assembled again, a second relation signal is generated for indicating the current location relationship between the terminals 54 and the terminal grooves 5121. The PCB 40 is utilized to compare the first relation signal to the second relation signal, when the second relation signal is different from the first relation signal, and the PCB 40 disables the anti-tamper device 100.

With the anti-tamper device 100 described above, when an unauthorized person tries to hack data from the system by detaching the top cover 10 from the bottom cover 20, the terminals 54 drop from the corresponding terminal grooves 5121 confusing the unauthorized person making it impossible to decide which pads 41 are electrically connected by the terminal. When the signal connector 50 is assembled to the PCB 40 and the terminals 54 are electrically connected to the pads 41 again, a second relation signal which is different from the first relation signal is generated to prevent the unauthorized person from enabling the anti-tamper device 100.

Many details are often found in the art such as the other features of an anti-tamper. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An anti-tamper device, comprising:
   a top cover;
   a bottom cover detachably coupled to the top cover;
   a printed circuit board (PCB) fixed to the top cover and located between the top cover and the bottom cover;
   a signal connector located between the PCB and the bottom cover, the signal connector defining a plurality of terminal grooves and a plurality of terminals received in the terminal grooves and electrically connected to the PCB; and
   an elastic element compressed and located between the signal connector and the bottom cover;
   wherein when the top cover is disassembled from the bottom cover, the PCB is separated from the signal connector, the elastic element releases the signal connector from the bottom cover to remove the terminals from the terminal grooves, when the anti-tamper is reassembled, relationships among the terminals and the terminal grooves being changed to make the anti-tamper being off work.

2. The anti-tamper device of claim 1, wherein the PCB comprises a plurality of pads, the pads respectively correspond to the terminal grooves.

3. The anti-tamper device of claim 2, wherein when the terminals are electrically connected to the corresponding pads, a first relation signal is generated by the PCB to enable the anti-tamper device; when the terminals are not connected to the corresponding pads, a second relation signal which is different from the first relation signal is generated by the PCB to make the anti-tamper device be off work.

4. The anti-tamper device of claim 1, wherein a first magnet is located on the signal connector, a second magnet is located on the PCB, the signal connector is locked on the bottom cover, when the top cover is coupled to the bottom cover, the second magnet attracts the first magnet to rotate relative to the bottom cover to unlock the signal connector.

5. The anti-tamper device of claim 4, wherein a bulge is located on the signal connector, a connecting groove is defined in the bottom cover, the bulge is received in the connecting groove to lock the signal connector on the bottom cover.

6. The anti-tamper device of claim 5, wherein the bottom cover has a bracket, the signal connector is rotatably supported by the bracket, the elastic element is located between the bracket and the signal connector.

7. The anti-tamper device of claim 6, wherein the bracket defines a connecting hole, the signal connector comprises a supporting board having a first surface facing the bottom cover, and a second surface facing the PCB, and a shaft protruding from the first surface, the shaft is rotatablely inserted into the connecting hole.

8. The anti-tamper device of claim 7, wherein the bracket comprises an inner sidewall surrounding the connecting hole, the connecting groove is defined in the inner sidewall, the bulge is located on the shaft, when the shaft is inserted into the connecting hole, the bulge is received in the connecting groove.

9. The anti-tamper device of claim 8, wherein the connecting groove comprises a first groove and a second groove, the first groove extends along an axis direction of the connecting hole, one end of the second groove is communicated with one end of the first groove close to the bottom cover.

10. The anti-tamper device of claim 7, wherein a pair of protrusions protrudes from the first surface, when the signal connector is coupled to the bracket, the protrusions contact with a top surface of the bracket away from the bottom surface.

11. The anti-tamper device of claim 7, wherein the plurality of terminal grooves are defined in the second surface, a number of the terminals receiving in the corresponding terminal grooves is less than a number of the terminal grooves.

12. The anti-tamper device of claim 7, wherein a gap is define in the second surface, the second magnet is located on the second surface and close to the gap, when the PCB is connected to the signal connector, the first magnet is inserted into the gap.

13. An anti-tamper device, comprising:
   a top cover;
   a bottom cover detachably coupled to the top cover;
   a printed circuit board (PCB) fixed to the top cover;
   a signal connector located between the PCB and the bottom cover, the signal connector defining a plurality of terminal grooves and a terminal received in a corresponding one of the terminal grooves and electrically connected to PCB; and
   an elastic element sandwiched between the signal connector and the bottom cover and generating an elastic force;
   wherein when the top cover is disassembled from the bottom cover, the PCB is separated from the signal connector, the elastic force drives the signal connector to motion to make the terminal drop from the at least one of the terminal grooves; when the anti-tamper is reassembled and the terminal is received another one of the terminal grooves different from the corresponding one terminal grooves, the anti-tamper is off work.

14. The anti-tamper device of claim 13, wherein the PCB comprises a plurality of pads, the pads respectively correspond to the terminal grooves, when the terminal is electrically connected to the corresponding pad, a first relation signal is generated by the PCB to enable the anti-tamper device; when the terminal is not connected to the corresponding pad, a second relation signal which is different from the first relation signal is generated by the PCB to make the anti-tamper device be off work.

15. The anti-tamper device of claim 13, wherein a first magnet is located on the signal connector, a second magnet is located on the PCB, the signal connector is locked on the bottom cover, when the top cover is coupled to the bottom cover, the second magnet attracts the first magnet to rotate relative to the bottom cover to unlock the signal connector.

16. The anti-tamper device of claim 15, wherein a bulge is located on the signal connector, a connecting groove is defined in the bottom cover, the bulge is received in the connecting groove to lock the signal connector on the bottom cover.

17. The anti-tamper device of claim 16, wherein the bottom cover has a bracket defining a connecting hole, the signal connector comprises a supporting board having a first surface facing the bottom cover, and a second surface facing the PCB, and a shaft protruding from the first surface, the shaft is rotatablely inserted into the connecting hole, the elastic element is located between the bracket and the signal connector.

18. The anti-tamper device of claim 17, wherein the bracket comprises an inner sidewall surrounding the connecting hole, the connecting groove is defined in the inner sidewall, the bulge is located on the shaft, when the shaft is inserted into the connecting hole, the bulge is received in the connecting groove.

19. The anti-tamper device of claim 18, wherein the connecting groove comprises a first groove and a second groove, the first groove extends along an axis direction of the connecting hole, one end of the second groove is communicated with one end of the first groove close to the bottom cover.

* * * * *